No. 813,231. PATENTED FEB. 20, 1906.
F. W. NIGHTINGALE.
SNOW SHOE FOR WHEELS.
APPLICATION FILED APR. 22, 1905.
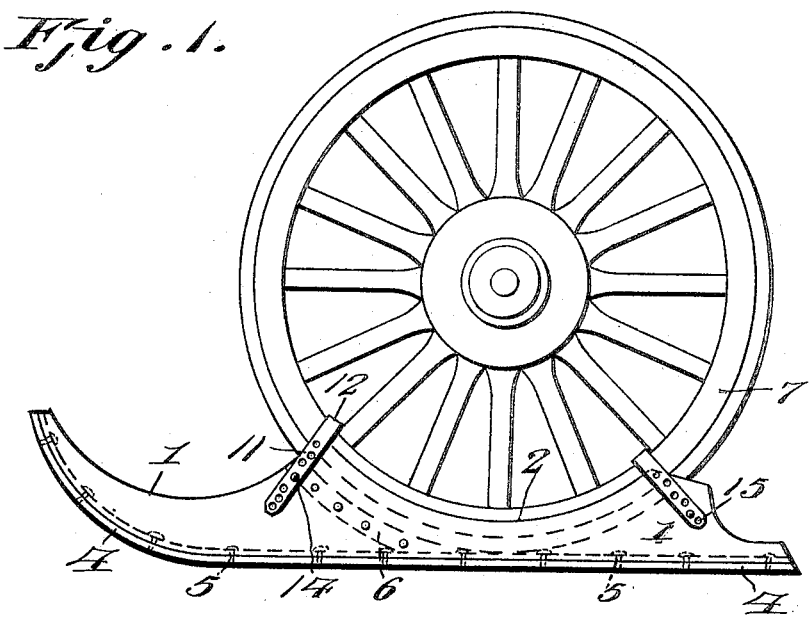
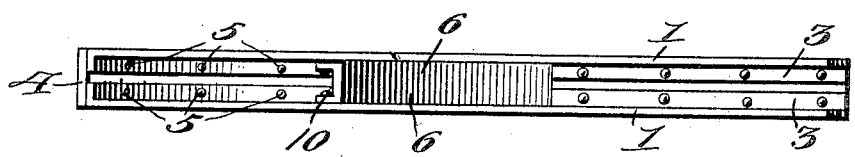
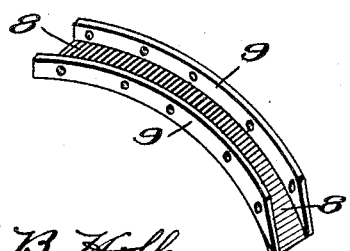
Witnesses
Frank B. Hoffman
D. W. Gould
Inventor
Frank W. Nightingale
By Victor J. Evans
Attorney

UNITED STATES PATENT OFFICE.

FRANK W. NIGHTINGALE, OF QUINCY, MASSACHUSETTS.

SNOW-SHOE FOR WHEELS.

No. 813,231. Specification of Letters Patent. Patented Feb. 20, 1906.

Application filed April 22, 1905. Serial No. 256,941.

*To all whom it may concern:*

Be it known that I, FRANK W. NIGHTINGALE, a citizen of the United States, residing at Quincy, in the county of Norfolk and State of Massachusetts, have invented new and useful Improvements in Snow-Shoes for Wheels, of which the following is a specification.

The invention relates to an improvement in runners arranged to be removably connected with an ordinary wheeled vehicle to adapt the same for use as sleighs.

The main object of the invention is the production of a runner of the class described constructed for removable connection to the wheels of a vehicle whereby the vehicle is readily adapted for use as a sleigh.

The invention in its preferred form will be described in detail in the following specification, reference being had to the accompanying drawings, wherein—

Figure 1 is a view in side elevation showing a wheel equipped with my improved runner. Fig. 2 is a plan view of the runner. Fig. 3 is a bottom perspective of the filler-block for the runner, and Fig. 4 is a perspective view of one of the connecting-straps.

It will be noted that I contemplate the use of a runner for each wheel of the vehicle and that these runners are identical in construction, so that a detail description of one will suffice for all.

Referring to the drawings, wherein like numerals of reference designate like parts throughout the several views, my improved runner comprises side plates 1, shaped on the upper edge intermediate its ends to conform with the curvature of the wheel, as at 2, and beyond said curvature formed in any desired ornamental outline. The lower edges of the side plates are bent inwardly at a right angle to provide flanges 3, the plates being so shaped that the flanges 3 are in the same horizontal plane for the greater portion of their length and curved upwardly therefrom at the forward end to provide a sleigh-runner of the accepted shape.

4 represents the runner-shoe, comprising an elongated plate secured beneath and directly to the flanges 3 of the side plates, said flanges being preferably spaced apart to properly space the vertical portions of the side plates and being secured to the shoe by suitable bolts 5. By this construction the runner is provided with a shoe of unbroken surface which may be readily detached from the runner proper and renewed when desired.

A filler-block 6 is secured intermediate the side plates of the runner to provide a bearing for the tire or rim of the wheel 7. This filler-block comprises a plate 8, curved concentrically to the curvature of the wheel and having depending flanges 9. The block is secured in place to receive the tread or tire of the wheel by suitable bolts 10, passing through the side plates 1 and the depending flanges 9 of the block. The rear end of the block rests on the flanges 3 of the side plates, while its forward end terminates above said flanges, so that portion of the tread of the wheel between the side plates and forward end of the vertical center of said tread is received and supported by the filler-block, whereby forward movement of the vehicle is transferred through the wheels to the runner.

11 represents connecting-straps, preferably of inverted-U shape, the cross-bar 12 of which is designed to engage the wheel-felly immediately forward of one of the wheel-spokes. The depending arms 13 of the strap are designed to respectively engage the outer surfaces of the side plates 1, being secured thereto by a pin 14, passing through one of a plurality of openings 15, formed in the arms 13 and through suitable apertures or openings in the side plates.

The connecting-strap is provided with a plurality of openings 15, arranged in any desired order longitudinally of the strap-arms 13, whereby to adapt the runner for connection with wheels having different width fellies.

It is understood that I prefer to use two of the connecting-straps 11, one secured to each end of the runner and embracing the wheel-felly; but a larger number of connecting-straps may be used, if desired.

It will be noted that the forward movement of the wheel forces the runner in the same direction through contact of the wheel with the filler-block and that in the use of the latter with the connecting-strap the runner is securely bound to the wheel in a manner to prevent accidental disengagement thereof and yet permit ready separation or the simple withdrawal of two or more of the bolts 14.

While I have shown and described the preferred details of my invention, it will be understood that I do not limit myself to the exact arrangement described, as various changes and modifications may be made without departing from the spirit and scope of the invention.

What I claim as new, and desire to secure by Letters Patent, is—

1. A runner for use with wheeled vehicles comprising side plates bent inward at their lower edges to provide flanges to receive and support the wheel, a shoe secured to the lower side of said flanges, and a filler-block secured between the side plates.

2. A runner for use with vehicles comprising side plates bent inward at their lower edges to provide flanges with which the wheel is adapted to contact, a shoe secured to the lower surface of said flanges, a filler-block comprising a curved plate having depending side flanges, the flanges of said block being secured to the side plates of the runner.

3. In combination with the wheel of a vehicle, of a runner comprising side plates having inwardly-projecting flanges at their lower edges adapted to receive and support the wheel, a shoe secured to said flanges, and a filler-block secured between the side plates and being curved in longitudinal section to conform to the curvature of the wheel.

In testimony whereof I affix my signature in presence of two witnesses.

FRANK W. NIGHTINGALE.

Witnesses:
 CLARENCE BURGIN,
 NELLIE L. REID.